United States Patent
Kirchhoff

(10) Patent No.: US 10,604,976 B2
(45) Date of Patent: Mar. 31, 2020

(54) VEHICLE DOOR CHECK

(71) Applicant: HELLA GmbH & Co. KGaA, Lippstadt (DE)

(72) Inventor: Friedhelm Kirchhoff, Erwitte-Ebbinghauusen (DE)

(73) Assignee: Hella GmbH & Co. KGAA, Lippstadt (DE)

( * ) Notice: Subject to any disclaimer, the term of this patent is extended or adjusted under 35 U.S.C. 154(b) by 101 days.

(21) Appl. No.: 15/837,319

(22) Filed: Dec. 11, 2017

(65) Prior Publication Data

US 2018/0100334 A1     Apr. 12, 2018

Related U.S. Application Data

(63) Continuation of application No. PCT/EP2016/062527, filed on Jun. 2, 2016.

(30) Foreign Application Priority Data

Jun. 10, 2015 (EP) .................................... 15171521

(51) Int. Cl.
E05C 17/04       (2006.01)
E05C 17/12       (2006.01)
(Continued)

(52) U.S. Cl.
CPC ............ *E05C 17/003* (2013.01); *E05B 51/02* (2013.01); *E05C 17/203* (2013.01); *E05C 17/22* (2013.01);
(Continued)

(58) Field of Classification Search
CPC ........ E05C 17/003; E05C 17/04; E05C 17/12; E05C 17/203
(Continued)

(56) References Cited

U.S. PATENT DOCUMENTS 5,842,255 A * 12/1998 Luca ........................ E05C 17/30
                                                      16/51
6,065,185 A *  5/2000 Breed ................... E05C 17/203
                                                     16/337
(Continued)

FOREIGN PATENT DOCUMENTS

| DE | 103 20 138 B3 | 1/2005 |
| DE | 10 2009 053 938 A1 | 5/2011 |
| DE | 10 2013 014 845 A1 | 3/2015 |
| EP | 0 474 918 A1 | 3/1992 |
| EP | 0 911 471 A1 | 4/1999 |
| EP | 1 951 977 B1 | 4/2009 |

(Continued)

OTHER PUBLICATIONS

International Search Report for PCT Application No. PCT/EP2018/06257 dated Aug. 30, 2016.

*Primary Examiner* — Emily M Morgan

(74) *Attorney, Agent, or Firm* — Muncy, Geissler, Olds & Lowe, P.C.

(57) ABSTRACT

A door check for vehicle doors, e.g. car doors having a door strap for being mounted to the chassis and a retainer for being mounted to the door movably and supporting the door strap relative to the retainer and provides a particular precise control over the door movement if the retainer has a cylinder supporting a piston which is spring loaded against the door strap and if an actuator is configured to augment the pressure in the cylinder upon demand to thereby augment the friction between the piston and the door strap.

11 Claims, 3 Drawing Sheets

(51) Int. Cl.
  *E05C 17/00*    (2006.01)
  *E05C 17/20*    (2006.01)
  *E05B 51/02*    (2006.01)
  *E05C 17/22*    (2006.01)
  *E05B 47/00*    (2006.01)

(52) U.S. Cl.
  CPC ......... *E05B 47/0004* (2013.01); *E05C 17/006* (2013.01); *E05Y 2201/21* (2013.01); *E05Y 2201/26* (2013.01); *E05Y 2900/531* (2013.01)

(58) Field of Classification Search
  USPC .............................................. 16/82, 85, 86 B
  See application file for complete search history.

(56) References Cited

U.S. PATENT DOCUMENTS

| | | | |
|---|---|---|---|
| 6,237,190 B1 * | 5/2001 | Grumm | E05C 17/32 |
| | | | 16/82 |
| 6,928,694 B2 * | 8/2005 | Breed | E05C 17/203 |
| | | | 16/82 |
| 7,363,785 B2 * | 4/2008 | Limburg | B60R 25/02153 |
| | | | 70/186 |
| 10,053,895 B2 * | 8/2018 | Cervantes, Jr. | E05C 17/56 |
| 2003/0182759 A1 * | 10/2003 | Breed | E05C 17/203 |
| | | | 16/82 |
| 2018/0010372 A1 * | 1/2018 | Rucha | E05C 17/006 |

FOREIGN PATENT DOCUMENTS

| | | |
|---|---|---|
| JP | S 61-191782 | 8/1986 |
| WO | WO 2015/048876 A1 | 4/2015 |

* cited by examiner

VEHICLE DOOR CHECK

This nonprovisional application is a continuation of International Application No. PCT/EP2016/062527, which was filed on Jun. 2, 2016, and which claims priority to European Patent Application No. 15171521.6, which was filed in Europe on Jun. 10, 2015, and which are both herein incorporated by reference.

BACKGROUND OF THE INVENTION

Field of the Invention

The invention relates to a door check for vehicle doors, e.g. car doors. The door check comprises a door strap for being mounted to the chassis or the door. The door strap is received by a retainer for being mounted to the door or the chassis, respectively. The door strap is movably supported by the retainer enabling a movement of the door strap relative to the retainer at least in the longitudinal direction of the door strap. The retainer comprises a cylinder with a piston, the latter being pressed against the door strap to provide friction slowing down a movement of the door strap relative to the retainer.

Description of the Background Art

When opening a car door, the movement of the door has to be stopped at last when the maximum opening angle of the door hinges is reached. In most cases the space to the left or right of the car, respectively is not sufficient to fully open the door. The door is likely to be slammed against neighbored cars, garage walls or the like. To avoid damages, car doors are equipped with door checks. The door checks mostly provide multiple defined opening angles. A person opening the door opens the door in increments until he or she expects the door to hit an obstacle if the opening angle is further increased.

EP 1 951 977 B1 discloses an example for a vehicle door check. The door check comprises a retainer with an essentially U-shaped linear bearing supporting a door strap. The door strap is pressed by a spring loaded piston into the U-shaped linear bearing to thereby provide friction slowing the swinging door down. The door strap is an essentially elongate slider with increasing thickness towards its mechanical end stop to thereby adapt the friction. However, this door check shows a significant slip stick effect due to the initial breakaway torque.

There have been attempts to reduce the slip stick effect, e.g. by using viscous type dampers with magnetorheological fluids. Another approach is provided by DE 10 2013 014 845 A1, whereby the door strap is clamped between an abutment and a brake shoe (or two brake shoes) with a lining. The brake shoe is spring loaded by a disk spring against the door strap. To reduce the slip stick effect a linear actuator lifts off the brake shoe and thus the lining to at least reduce the friction between the lining and the door strap and thus the initial breakaway torque.

Other means for braking a door strap are disclosed e.g. in DE 103 20 138 B4, which corresponds to U.S. Pat. No. 7,363,785, and WO 2008/100233 A2

SUMMARY OF THE INVENTION

It is therefore an object of the invention to provide a simple door check, in particular for vehicle doors enabling to actively control enabling or disabling movement of the door and that provides a fail safe mode.

The door check comprises at least a door strap. The door strap may be, for example, an elongate bar or rod for connecting the chassis of the car with a retainer. The door strap could be referred to as connection bar or connection rod. The door strap may be hinged to the chassis or comprise a hinge for mounting the door strap to the chassis and comprise at least one sliding surface. The door strap may have a constant diameter and/or thickness at least in the section having the sliding surface.

A retainer for being mounted to a vehicle door may movably support the door strap. For example, the retainer may provide an e.g. linear bearing enabling at least a linear movement of the door strap along the longitudinal axis of the door strap.

The retainer may further comprise at least one cylinder with a cylinder axis, a cylinder bottom and an opposed cylinder opening. The cylinder may accommodate a piston, the latter being movably in the cylinder along the cylinder axis. The piston may be considered as a slider being movably supported by the cylinder. The piston may be spring loaded to transmit a force to the door strap thereby creating a frictional force opposite to the movement of the door strap. For example, a lining may be attached to the piston at its door strap facing side. Pushing the piston against the door strap (more precisely against the sliding surface of the door strap) thus causes a frictional force opposite to an eventual movement of the door strap relative to the retainer and thus opposite to a corresponding movement of the door. The frictional force thus slows the door down.

The door check comprises a door strap for being mounted to the chassis and a retainer for being mounted to the door and providing a bearing for movably supporting the door strap relative to the retainer. The retainer may comprises a cylinder supporting a piston which is spring loaded against the door strap and if an actuator, configured to augment the pressure in the cylinder upon demand to thereby augment the friction between the piston and the door strap.

The retainer can comprise a retaining plate for supporting the door strap. A lining or sliding pad may be attached to the door strap facing side of the retaining plate. The door strap may be positioned between the piston and the retaining plate and in contact with both to provide a frictional force in case the door strap is moved relative to the retainer. The retaining plate so to speak provides an abutment for the force exerted by the piston on the door strap.

The retainer and the piston (with the optional friction pads) may provide a linear bearing for the door strap.

The spring loading of the piston towards the door strap can be obtained by providing at least one spring in the cylinder between the piston and the cylinder bottom. The spring may use the cylinder bottom as abutment. Alternatively, the cylinder may for example comprise a rim or a step wise reduced diameter providing an abutment for the spring.

A controllable actuator may be coupled by a coupler to the piston. The actuator enables to exert and/or increase the force exerted via the piston to the door strap and thus the friction. The actuator may thus apply an additional force in the direction of the door strap to the piston. The force provided by the actuator enables to augment the friction, e.g. to block any movement of the door strap and thus the door on demand. The door strap may by literally clamped by the piston or between the piston and the retaining plate to thereby inhibit any movement of the door. In an example, a sensor monitors the space remaining besides a door and provides the information to a controller. The controller may activate the actuator to increase the force applied by (or via) the piston to the door strap in case the door will hit an obstacle if further opened. Accordingly the controller thereby slows the door strap and thus the door down until the movement stops. Another application is to block the door strap by applying a corresponding force via the actuator and the piston to the door strap and thus the door at a selected opening angle to enable use of the door as help for getting in or out of the car. The blocked door so to speak can be used as boarding aid, the blocked door converts into a handrail.

The coupler may bypass the spring (if provided). Thereby, the force provided by the actuator is only an additional force added to the force provided by the spring. This reduces the load of the electrical system of the car for blocking the door strap.

Due to the combination of the at least one spring and an actuator, the door is slowed down even in case the actuator or its controller fails. Further, in normal operation the actuator may be switched off, thereby reducing the load of the electrical system of the car. The friction provided by the force exerted by the spring may be sufficient to slow the door down under normal operation.

For example, a plunger may transmit the additional force provided by the actuator to the piston. The plunger can be aligned with the cylinder axis and may be coaxially with the spring (if provided), this eases manufacture and enables to reduce the dimensions of the retainer.

The plunger may be in direct contact with the piston, in this case the plunger may resemble a slab or a push rod but in a particularly preferred embodiment, the plunger only reduces the volume between the piston and the cylinder bottom if moved (further) inside the cylinder, e.g. towards the piston. The fluid inside the cylinder, i.e. between the piston and the cylinder bottom (e.g. air, a hydraulic oil or the like) is compressed and the force which is applied to the plunger is transmitted to the piston and thus 'clamps' the door strap. In other words, the volume between the cylinder bottom and the piston is filled with a fluid and activation of the actuator augments and/or reduces the fluid pressure (depending on the direction), thereby augmenting and/or reducing, respectively, the force via the piston to the door strap.

In this example, the plunger is in fact a further (master) piston, and only to avoid ambiguities the term plunger is used. The term plunger thus enables to distinguish the further piston for pressurizing the fluid from the piston being pushed against the door strap.

The surface of the plunger's end face (more precisely its orthogonal projection along the plunger's axis of movement) may be significantly smaller that the piston's end face to thereby augment the force transmitted via the piston to the door strap. For example the surface of the plunger's end face may be smaller e.g. ¼, preferably ⅛ or even smaller ⅒ of the corresponding surface of the piston. The traveling path of the piston would be augmented accordingly in case the piston moves, but as the cylinder preferably slides over the door strap, there is no traveling path of the piston if the fluid has a low compressibility and the drawback of an augmented traveling path of the plunger is thus not existent in case the door strap has a constant cross section. Accordingly the fluid can be incompressible or has a low compressibility.

The plunger thus may engage into a complementary, so called further opening of the cylinder, e.g. of the cylinder bottom. Pushing the plunger into the cylinder augments the fluid pressure and thus the force applied by the piston to the door strap. Releasing the plunger reduces the pressure and only the (optional) spring load remains on the piston. The plunger can be movably supported by the complementary further opening of the cylinder. The further opening may provide a linear bearing for the plunger enabling an axial movement of the plunger. Preferably the plunger axis and cylinder axis are parallel or identical.

The actuator may comprise a coil and a linearly movable armature wherein a current through the coil exerts a force on the armature which is transmitted by the coupler to the piston. The force may be a reluctance force. As explained above the coupler may comprise a plunger and a fluid, the plunger being driven by the actuator and configured to pressurize the fluid.

The armature can be coupled to the plunger. For example, the plunger can be a protrusion e.g. a pin or a trunnion of the armature. This is very simple but efficient, in particular, if the further cylinder opening provides a linear bearing for the plunger thereby supporting the armature as well.

A coupling plate can be positioned at the end of the armature facing away from the piston. The coupling plate may be of a magnetic material to enhance the magnetic force applied to the piston (if energized). Further, the coupling plate may extend over the coil's respective front facing side, to enhance the magnetic force. In a particular preferred embodiment a booster spring may be positioned between the coupling plate and a booster housing's abutment plate, to thereby spring load the armature towards the piston. This measure as well enhances the force applied to the piston and reduces rattling of the armature, the piston and/or the door strap.

The abutment plate can be releasably connected to the booster housing. Thus, the booster housing and the actuator housing, e.g. a solenoid housing may be a single part. The coil, the armature, the coupling plate and the booster spring may each be inserted into the housing via the opening to be closed by fixing the abutment plate. For example the abutment plate may be clamped or press fitted into an axial opening of the booster housing The actuator can be a solenoid drive, but other types of actuators can be used as well to apply a force via the piston to the door strap. For example, the plunger could be coupled to a piezo actuator, e.g. a stack of piezo materials, a piezo motor, or a usual motor rotating a threaded plunger in a threaded further opening of the cylinder to thereby push the plunger into the cylinder or retract it, depending on the direction of the rotation.

The door strap can be mounted to the chassis and the retainer to the door, but of course it could be as well the other way round, i.e. that the retainer is mounted to the chassis and the door strap to the door.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
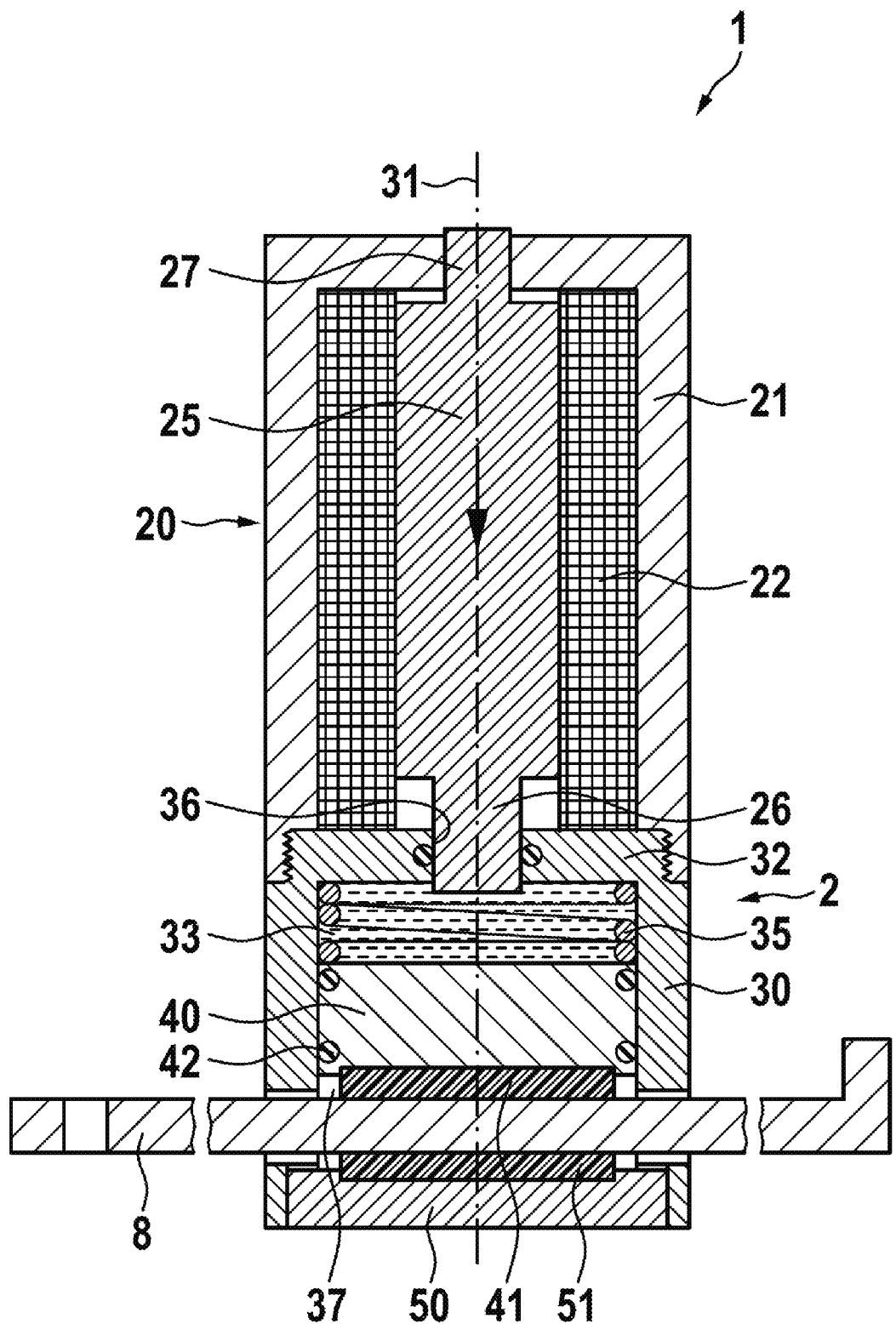
FIG. 1 shows a cross section of a door check.

The door check 1 of FIG. 1 comprises a door strap 8 for being hinged to the chassis of a car and a retainer for being mounted to a car's door. The door strap 8 is movably supported by the retainer 2 between friction pads 41 and 51 being attached to a piston 40 and a retaining plate 50, as will be explained below in more detail.

The retainer 2 has a cylinder 30 with a cylinder axis 31, a bottom 32 and a cylinder opening 37 opposed to the bottom. A piston 40 is positioned inside the cylinder 30 and may be moved along the cylinder axis 31. The slit between the cylinder and the piston is preferably at least almost fluid tight, e.g. due to O-rings 42 or any other type of gasket. A spring 35 is positioned inside the cylinder 30 and forces the piston 40 towards the door strap. One end of the spring 35 abuts the cylinder bottom 32 and the other end abuts the piston 40; the piston 40 is thus spring loaded towards the door strap 8. Depending on the load of the spring 35, the door strap 8 is 'movably clamped' between the piston 40 and the retaining plate 50, or more precisely between the respective friction plates 41, 51, as well referred to as linings 41, 51. A movement of the door strap is thus possible, but only against a friction force.

The cylinder bottom 32 has a further opening 35 movably accommodating a plunger 26. The plunger 26 is a further piston and may be pushed into the cylinder or released. In case it is pushed into the cylinder 30, the fluid 33 inside the cylinder is compressed and accordingly the force applied by the piston 40 to the door strap 8 is augmented. Thus the friction is augmented. Depending on the pressure inside the cylinder 30, the friction enables to slow the door strap 8 down or even to clamp it tightly to thereby block the door.

A linear drive may be used to apply a force to the plunger 26, i.e. to push the plunger 26 through the further opening 36 into or towards the cylinder 30. In the depicted example, the actuator is a solenoid drive with a solenoid housing 21, a coil 22 and a movable armature 25. The armature 25 may be movably supported inside the coil 22. The coil axis and/or the armature's longitudinal axis may be parallel or as shown in the FIGS. 1 to 3 identical with cylinder axis 31. The armature 25 has two opposed narrow facing sides, from each of which extends a pin 26, 27. The pin 26 facing the cylinder 30 may be the plunger 26, as shown. The plunger 26 may be supported by a linear bearing provided by the further opening 36 of the cylinder bottom. The opposite pin 27 may be supported by a further linear bearing being e.g. provided by a corresponding opening of the solenoid housing 21. Accordingly, the armature 25 is axially movable.

When applying a current to the coil 22 the magnetic force causes the armature 25 to push the plunger 26 towards the cylinder 30. The corresponding force augments the pressure inside the cylinder 30 and thus the force transmitted via the piston 40 to the door strap 8. This additional force enables to stop quickly or even prevent any movement of the door strap and thus the door at any position. For example: A car's door is opened and an obstacle limits the opening angle of the door. In this case a sensor may detect the obstacle and a controller controlling the current through the solenoid may augment the current to stop the door strap and thus the door well or at least just before it hits the obstacle.

Figure 2:
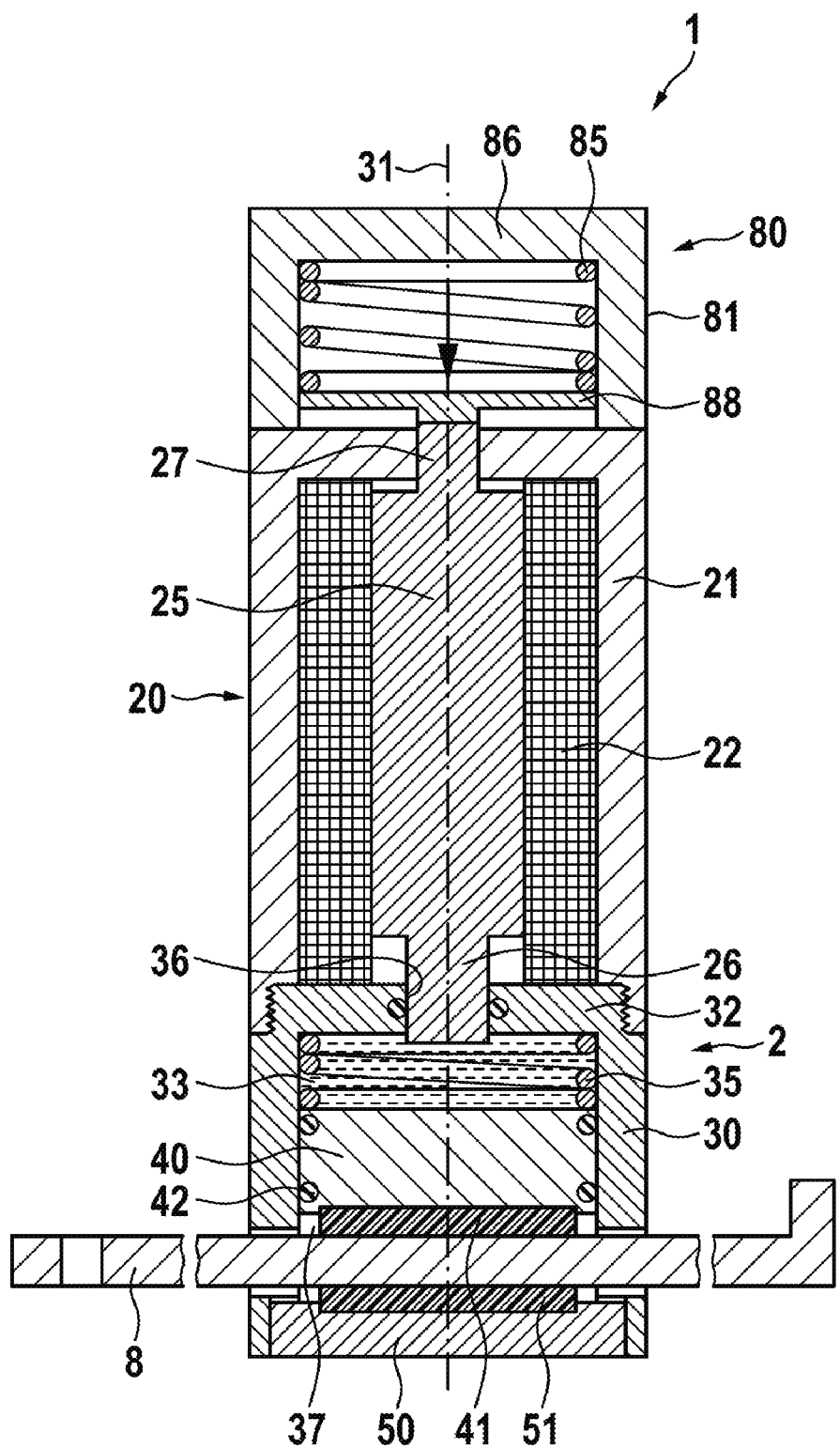
FIG. 2 shows a cross section of a second door check.

The door check of FIG. 2 is rather similar to the door check of FIG. 1, accordingly the same reference numerals are used for identical or similar details. The above description reads as well on the example of FIG. 2. To further enhance the force applied to the plunger 26, a booster 80 is attached to the linear drive 20. The booster 80 may comprise a booster housing 81 attached to the actuator housing 21. A coupling plate 88 is positioned inside the booster housing 81 on the pin 27 supporting a booster spring 85 being positioned between the coupling plate 88 and an abutment plate 86 of the booster housing 81. Preferably, the coupling plate 88 is of a magnetic material being attracted by the magnetic field of the coil 22 (if energized). The coupling plate 88, the pins 26, 27 and the armature may be formed as a single piece. The force of the booster spring 85 may be comparatively low, but it prevents the retainer from rattling, as rattling is unacceptable in automotive applications.

Figure 3:
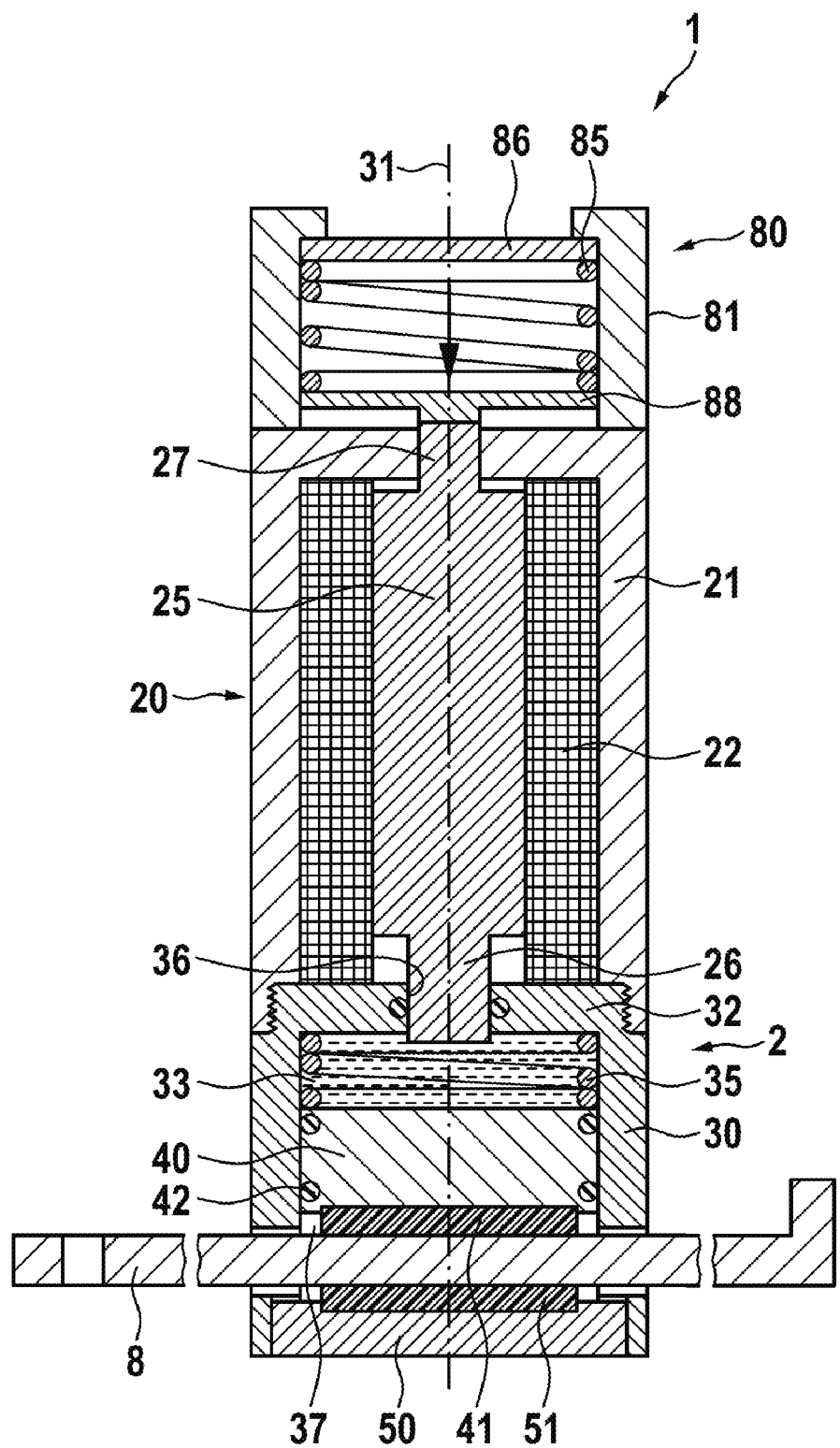
FIG. 3 shows a cross section of a third door check.

The example of FIG. 3 is an additional example of a door check with a booster 80. The above description of FIG. 2 applies as well to FIG. 3. The difference that the actuator housing 21 and the booster housing 80 are made of a single piece. To ease assembly, the abutment plate 86 is clamped into the booster housing's wall.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A door check comprising:
    a door strap for being movably mounted to a vehicle chassis;
    a retainer for being mounted to a vehicle door, the door strap being movably attached to the retainer such that a movement of the door strap relative to the retainer is enabled along a longitudinal axis of the door strap, the retainer comprising at least one cylinder with a cylinder axis, a cylinder bottom and an opposed cylinder opening, the at least one cylinder accommodating a piston, the piston being movable along the cylinder axis and being spring loaded by a spring to transmit a force to the door strap thereby creating a frictional force opposite to a movement of the door strap; and
    a linear drive adapted to increase a force exerted via the piston to the door strap,
    wherein the at least one cylinder has a further opening that extends through the cylinder bottom to receive a plunger, wherein the plunger protrudes from an end of a linearly movable armature of the linear drive and wherein the plunger extends through the further opening,
    wherein a fluid is provided inside the at least one cylinder, the fluid being contained in a chamber formed within the at least one cylinder between the piston and the cylinder bottom,
    wherein an upper end of the spring directly contacts an inner surface of the cylinder bottom,
    wherein the spring is positioned in the at least one cylinder between the cylinder bottom and the piston, the spring loading the piston towards the door strap, and
    wherein an activation of the linear drive to push the plunger toward the piston compresses the fluid inside the chamber of the at least one cylinder to increase the force exerted via the piston to the door strap.

2. The door check of claim 1, wherein an activation of the linear drive to move the plunger away from the piston reduces a fluid pressure of the fluid inside the chamber of the at least one cylinder thereby reducing the force exerted via the piston to the door strap.

3. The door check of claim 1, wherein the linear drive comprises a coil and the linearly movable armature, wherein a current through the coil exerts a force on the armature that is transmitted to the plunger and by the plunger to the piston.

4. The door check of claim 1, wherein when a portion of the plunger extends into the at least one cylinder through the further opening in the cylinder bottom, the portion of the plunger is encircled by the spring.

5. The door check of claim 1, wherein the cylinder opening is closed by a retaining plate, such that the door strap is retained between the retaining plate and the piston.

6. The door check of claim 5, further comprising a first friction pad and a second friction pad,
wherein the first friction pad is positioned between the piston and the door strap, and the second friction pad is positioned between the retaining plate and the door strap, such that door strap is retained between, and directly contacted by, the first friction pad and the second friction pad.

7. The door check of claim 1, wherein the at least one cylinder and the cylinder bottom are unitary, such that the cylinder bottom remains stationary during linear movement of the plunger.

8. A door check comprising:
a door strap for being movably mounted to a vehicle chassis;
a retainer for being mounted to a vehicle door, the door strap being movably attached to the retainer such that a movement of the door strap relative to the retainer is enabled along a longitudinal axis of the door strap, the retainer comprising at least one cylinder with a cylinder axis, a cylinder bottom and an opposed cylinder opening, the at least one cylinder accommodating a piston, the piston being movable along the cylinder axis and being spring loaded by a spring to transmit a force to the door strap thereby creating a frictional force opposite to a movement of the door strap;
a linear drive adapted to increase a force exerted via the piston to the door strap,
wherein the linear drive comprises a coil and a linearly movable armature, wherein a current through the coil exerts a force on the armature that is transmitted to a plunger and by the plunger to the piston, and
the door check further comprising a booster with a magnetic coupling plate, wherein the magnetic coupling plate is positioned at the end of the armature facing away from the piston.

9. The door check of claim 8, wherein the coupling plate extends over a front facing side of the coil.

10. The door check of claim 8, wherein a booster spring is positioned inside a booster housing of the booster, between the coupling plate and an abutment plate of the booster housing.

11. The door check of claim 10, wherein the abutment plate is releasably connected to the booster housing.

* * * * *